(12) United States Patent
Cantolino (10) Patent No.: US 7,896,301 B1
(45) Date of Patent: Mar. 1, 2011

(54) CLAMPING DEVICE WITH DUAL RAIL PLATES

(76) Inventor: Christopher Ralph Cantolino, Bradenton, FL (US)

(*) Notice: Subject to any disclaimer, the term of this patent is extended or adjusted under 35 U.S.C. 154(b) by 418 days.

(21) Appl. No.: 12/174,928

(22) Filed: Jul. 17, 2008

Related U.S. Application Data (63) Continuation-in-part of application No. 12/012,307, filed on Jan. 31, 2008, now Pat. No. 7,710,283.

(51) Int. Cl.
   *A47F 5/00* (2006.01)
(52) U.S. Cl. ............ 248/228.2; 248/229.1; 248/229.15; 248/309.1
(58) Field of Classification Search ............ 248/228.2, 248/229.1, 229.15, 229.11, 228.1, 228.6, 248/230.2, 230.6, 231.31, 231.85, 223.41, 248/309.1, 316.8, 213.2, 231.81, 228.7, 229.26, 248/229.16
   See application file for complete search history.

(56) References Cited

U.S. PATENT DOCUMENTS

| | | | | |
|---|---|---|---|---|
| 2,033,811 A | * | 3/1936 | Bongiovanni | 248/231.71 |
| 2,319,521 A | * | 5/1943 | Schneider et al. | 280/484 |
| 2,803,417 A | * | 8/1957 | Gruber | 248/103 |
| 5,184,911 A | * | 2/1993 | Wu | 403/385 |
| 5,322,253 A | * | 6/1994 | Stevens | 248/229.15 |
| 6,023,800 A | * | 2/2000 | Stickley | 5/621 |
| 6,679,465 B1 | * | 1/2004 | Leasure | 248/229.15 |
| 7,111,812 B2 | * | 9/2006 | Shannon et al. | 248/230.7 |

* cited by examiner

*Primary Examiner*—Anita M King
(74) *Attorney, Agent, or Firm*—Dorothy S. Morse (57) ABSTRACT

A clamping device of unitary construction comprising a tubular bridge secured between an inverted U-shaped clamping member with a vertically-extending slot and two rail plates placed in a back-to-back configuration. The dual rail plate structure permits the mounting of a pivotally-deployable float switch within the lowermost corner of a tilted fluid collection pan, when expedited response time is needed for stopping fluid flow into a collection container after only a minimal amount of fluid has accumulated in the lowered corner. The unitary construction of the clamping device, use of thumbscrews to secure its clamping member over the top edge of a fluid collection container wall, and its simple rail plate construction allow for rapid installation of a float switch within a fluid collection pan or other fluid collecting container. Vertically-extending internal ribs strengthen the clamping member. Preferred plastic materials also make the clamping device impervious to corrosion.

20 Claims, 9 Drawing Sheets

CLAMPING DEVICE WITH DUAL RAIL PLATES

CROSS-REFERENCES TO RELATED APPLICATIONS

This application is a continuation-in-part of still U.S. Ser. No. 12/012,307, filed by the same inventor on Jan. 31, 2008 now U.S. Pat. No. 7,710,283 for overlapping and substantially similar subject matter. All possible benefit of this previously filed patent application is herein requested.

BACKGROUND OF THE INVENTION

1. Field of the Invention

This invention relates to mounting and clamping devices, specifically to a clamping device comprising unitary construction wherein two rail plates are connected via a bridge to one another in back-to-back orientation, and are also connected via an extension of that same bridge to an inverted U-shaped clamping member having a vertically-extending slot and opposed interior ridges on both sides of the slot. The present invention clamping device can be used to rapidly and securely mount a float switch from the top edge of a fluid collection container wall (metal or plastic), and further impart stability to the mounted float switch that will allow the float switch to reliably and repeatedly monitor fluid level changes within the container for extended periods of time with little or no maintenance or inspection, and also allow the float switch to promptly take action to stop fluid flow into the container any time the depth of fluid already accumulated therein exceeds a pre-determined threshold level considered safe. The present invention clamping device further requires no hole in the container wall for its mounting, thus saving labor/expense over the installation prior art devices used for float switch installation that require a hole to be drilled on-site in a container wall or otherwise formed in the wall in advance of installation. Furthermore, only two fasteners are typically needed to securely fix the wide inverted U-shaped clamping member into its position of use over the top edge of a vertically-extending container wall, with this simple mounting procedure saving additional installation time over that needed for prior art devices, with the additional time savings in part being a consequence of the rapid mounting procedure used and in part due to the rail plate connection of the float switch housing that automatically places the float body associated with the housing in the level orientation needed for its optimal function, with the only after-mounting action required by an installer being confirmation that float body deployment occurs at or before the pre-determined threshold depth of fluid accumulation in the associated pan no longer considered safe and if it doesn't, adjustment of the float body to the proper height. This height adjustment can easily be accomplished by release of the lock-nut securing the rail plate connection member of a float switch housing within one of the rail plate channels of the present invention, subsequent raising or lowering of the rail plate connection member within the channel, and then a re-tightening of the lock-nut to securely fix the rail plate connection member again within the rail plate's open-front configuration channel. Also, the sturdy and substantial construction of the clamping member, the secure and non-wobbling engagement of the clamping member with the container wall, and the secure and non-wobbling connection of the float switch housing to one of the present invention rail plates, all help to significantly reduce the opportunity for a change in float switch orientation over time that could diminish float switch responsiveness or function. Additionally, preferred plastic materials make the clamping device impervious to corrosion and reliable for extended duration use. No other clamping device is known with the same dual rail plate and bridge structure, or known to provide all of the advantages of the present invention.

2. Description of the Related Art

When air conditioning condensate and other fluids are collected, there is often a risk of overflow or back-up into the system producing it, even when a large pan or other large container is employed to collect the generated fluid, or a drain line connection is added. As a result, liquid-level monitoring float switches have been used with fluid collection pans for automated shut-off of the source of condensate or other fluid flow when the amount of fluid collected within it exceeds a pre-determined threshold depth considered safe. Furthermore, particularly in condensate collection applications, the condensate generally continues to flow into a collection container for a period of time (at least several minutes) after the system or unit producing it has been turned off. Therefore, prompt shut-off of fluid/condensate production is always desired when safety concerns are realized. Thus, float switches are usually made and installed to react in a very minimal depth of collected fluid, unless a specific application dictates otherwise. However, there is a common practice among installers that further complicates low-level fluid collection monitoring. They often tilt a fluid collection pan or other fluid collecting container toward one of its corners to prevent central accumulation of fluid that could add significant weight to a pan, particularly a suspended fluid collection pan, thereby substantially accelerating the probability of its deformation, cracking, and/or collapse. While the pan tilting practiced by installers solves one important problem, it creates another, how to best monitor fluid in the corner of a pan with minimal delay of shut-off signal generation. Pivoting float switch bodies have more reliable operation than those whose deployment is guided only by a centrally positioned rod, and are preferred. However, known prior art float switch mounting devices typically secure pivotally-deployed float switches so that they extend outwardly from a collection pan wall in an orientation perpendicular to the supporting wall, with the deployable end of the float body located at the greatest distance from the pan wall. This distance might be as much as three inches, or greater. Therefore, even if a float switch mount is moved as close as it can possibly get to a corner of a fluid collection pan, the deployable end of the float switch still remains a minimum of approximately three inches away from that corner and is not able to monitor the area of a tilted pan where the greatest fluid accumulation is expected to occur. In contrast, the present invention mounting device (with its dual rail plates located in a back-to-back orientation one to the other) causes the deployable end (also referred to herein as a test lever) of a float body to extend outwardly from one of the rail plates in a direction substantially parallel to the container wall. Thus, when the clamping member of the present invention is placed over the top edge of a fluid collecting container wall to position the deployable end (test lever) of a float body as close as it can get to a collection pan corner (and still remain freely deployable and responsive to rising fluid depth), the lateral portion of the deployable end becomes located no more than one-half inch from the pan's corner and in a very good position to monitor corner fluid accumulation, as well as cause a prompt fluid shut-off signal to be sent to the fluid-producing system responsible for fluid accumulation in the container when fluid depth in the corner exceeds a pre-determined depth no longer considered safe. Thus, the total amount of fluid collected prior to shut-off signal generation is significantly diminished, reducing the overall risk of injury and damage to the fluid-producing system and/or container surroundings. In addition, the back-to-back orientation of the present invention rail plates to one another also provides an installer with another advantage over prior art float switch mounting devices, the option of placing the float switch to the right of the clamping member, or to the left, whichever best suits an application.

Furthermore, the design and construction of present invention overcomes lean in problems that sometimes result from the use of condensate collection pans having insubstantial construction which may occur as a result of a small/thin wall thickness dimension, a wall with inconsistent thickness dimension, and/or materials that do not hold up well in the high temperatures often experienced in attics where some pan installations occur. Therefore, when a float switch is mounted on a pan wall, the mere addition of its weight to the wall may cause the wall to lean in and adversely change the switch's vertical orientation, and as the orientation becomes changed, the switch's responsiveness to rising fluid levels may become diminished or sporadic, thus negating its primary purpose of reliable and long-term fluid monitoring, as well as prompt shut-off of fluid production when a threshold depth of fluid accumulated in the pan considered safe is exceeded. Also, when the installation of prior art float switches requires the drilling of at least one hole through the wall of a fluid collection pan or other fluid collecting container, the time and cost of installation is increased. In contrast, the present invention uses at least two fasteners (preferably two, but more is an option) to securely fix a clamping member over the top edge of the wall of a fluid collection pan, and no pre-made hole or on-site drilling in the wall is required for clamping member installation, significantly reducing installation time and expense. Furthermore, a plurality of present invention features (including but not limited to vertically-extending interior ribs, a tubular bridge between back-to-back rail plates and a clamping member, and an inverted U-shaped clamping member having sturdy construction) all contribute to strengthening the present invention clamping device and allowing it to have a stable installation even on weaker fluid collection pan walls, as well as overcome the lean in problems and resulting orientation change for mounted float bodies that would be otherwise be expected to occur and diminish or otherwise adversely affect float body responsiveness to rising fluid as it accumulates in an associated fluid collection pan. No prior art mounting device is known to have dual rail plates in a back-to-back orientation to one another that extends a float switch in a direction parallel to the container wall supporting it (instead of providing a perpendicular extension) so that a small amount of fluid in the corner of a tilted container can be used for prompt/reliable fluid level monitoring and shut-off. In addition, no other structure is known that provides all of the benefits and advantages of the present invention clamping device.

BRIEF SUMMARY OF THE INVENTION

Objectives and Advantages

The primary object of the present invention is to provide a time-saving clamping device able to position a float switch very close to the corner of a fluid collection pan for prompt, reliable, and responsive fluid shut-off function when accumulation therein exceeds a threshold amount considered safe. It is also an object of the present invention to provide a clamping device that has the type of simple cost-effective construction and assembly needed for widespread distribution and use. A further object of the present invention is to provide a clamping device designed for prompt and cost-effective installation. It is also an object of the present invention to provide a clamping device that is adjustable for secure installation of a float switch and allowing the originally established orientation of the float switch to be substantially maintained during its entire period of use. Another object of the present invention is to provide a clamping device with a design that compensates for insubstantial condensate collection pan construction and overcomes lean in problems that could otherwise adversely change the orientation of a mounted float switch body and diminish the reliability and promptness of its function. In addition, it is a further object of the present invention to provide a clamping device that is made from corrosion-resistant materials capable of resisting premature deterioration and malfunction for long duration use without frequent maintenance an/or inspection.

As described herein, properly manufactured and used, the present invention provides a clamping device for mounting a float switch in a secure and fixed position of use relative to a fluid collection pan or other fluid collecting container, wherein after its mounting the float switch is able to promptly, reliably, and repeatedly shut-off the flow of condensate or other fluid into the associated pan or container when the amount of fluid collected therein exceeds a pre-determined maximum depth considered safe, even when the accumulation is limited to a corner of the pan or container when it is in a tilted orientation. Its back-to-back dual rail plate configuration secures the deployable end of a float switch within one-half inch of any corner of a fluid collection pan or other fluid collecting container, and also allows the versatility of extending the float switch either to the right or left of the position on the container wall where the present invention clamping member is mounted, according to application need or installer convenience. The present invention is typically made from plastic (and is thereby impervious to corrosion), which in combination with its sturdy construction prevents premature fluid-related deterioration and/or malfunction. The present invention also has a unitary structure and simple attachment over the top edge of the vertically-extending wall of a fluid collection pan or other fluid collecting container, which in addition to the preferred use of only two fasteners to secure the clamping member to a container wall, promotes ease of use and cost efficient manufacture over prior art float switch mounting devices. Furthermore, the use of short thumbscrews having an oversized head configured for easy hand manipulation is preferred for mounting the present invention clamping member to a vertically-extending wall, as it facilitates and expedites present invention installation without the need for drilling a hole in the wall of the container, making the installation of a float switch via use of the present invention prompt, efficient, and cost-effective, when compared to many prior art float switch mounting devices. Furthermore, the design of the present invention inverted U-shaped clamping member includes a plurality of vertically-extending internal ribs on both sides of its vertically-extending slot that collectively provide sturdy construction to help overcome insubstantially constructed fluid collection pan walls, when encountered. In addition, the tubular construction of the bridge and its extension between the rail plates enhance the strength of the present invention clamping device by securely fixing the position and orientation of an associated float switch for optimal function over an extended period of time with little or no need for maintenance or inspection. The use of rail plates in the present invention clamping device also facilitates and expedites the mounting of a float switch to a fluid collection pan wall for fluid-depth monitoring purposes, and allows for easy on-site vertical height adjustability of the float body according to application need, while also making the connection of the float switch housing to a rail plate sufficiently secure so that performance-reducing changes in the after-installation orientation of the float body are not likely to occur.

Although the description herein provides preferred embodiments of the present invention, it should not be construed as limiting the scope of the present invention clamping device. For example, variations in the size, location, number, and spaced-apart location of the multiple threaded openings provided through the inverted U-shaped clamping member for insertion of a thumbscrew or other fastener; the depth and width dimensions of the vertically-extending slot in the inverted U-shaped clamping member; the number, location, configuration, and spaced-apart distance of the vertically-extending internal ribs preferably positioned on each side of the slot in the present invention clamping member; the relative height dimensions of the present invention clamping member, the rail plates, and the bridge; and the configuration and dimension of the thumbscrews or other fastening means used to secure the clamping member over the top edge of a vertically-extending container wall; in addition to those variations shown and described herein, may be incorporated into the present invention. Thus, the scope of the present invention should be determined by the appended claims and their legal equivalents, rather than being limited to the examples given.

DETAILED DESCRIPTION OF THE INVENTION

Figures 1, 2:
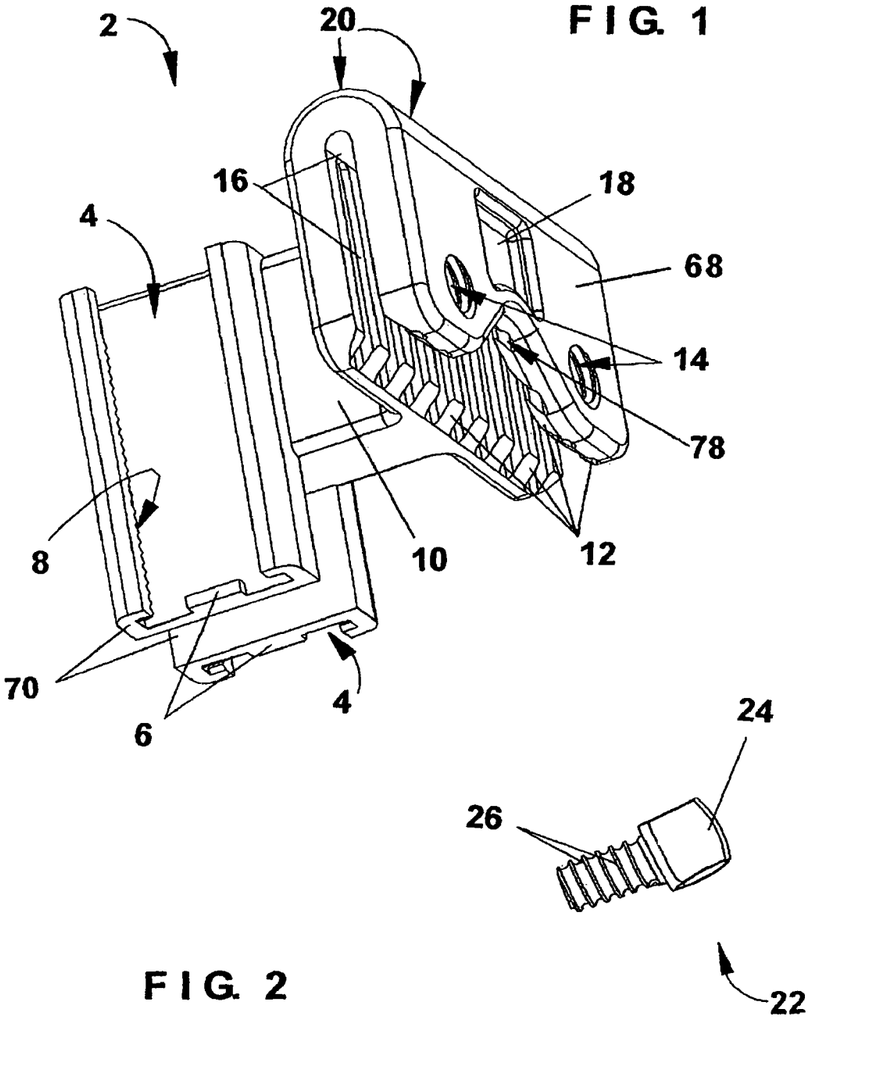
FIG. 1 is a perspective view of the most preferred embodiment of the present invention comprising a unitary structure that includes an inverted U-shaped clamping member having a vertically-extending slot with a closed upper end, the clamping member connected via one end of a bridge to dual rail plates, each of which is connected to the opposing end of the bridge in back-to-back orientation to one another with the bridge extending between them.
FIG. 2 is perspective view of one configuration of thumbscrew that can be effectively used as a part of the most preferred embodiment of the present invention to secure the clamping member over the top edge of the vertically-extending wall of a fluid collecting container.
Figure 3:
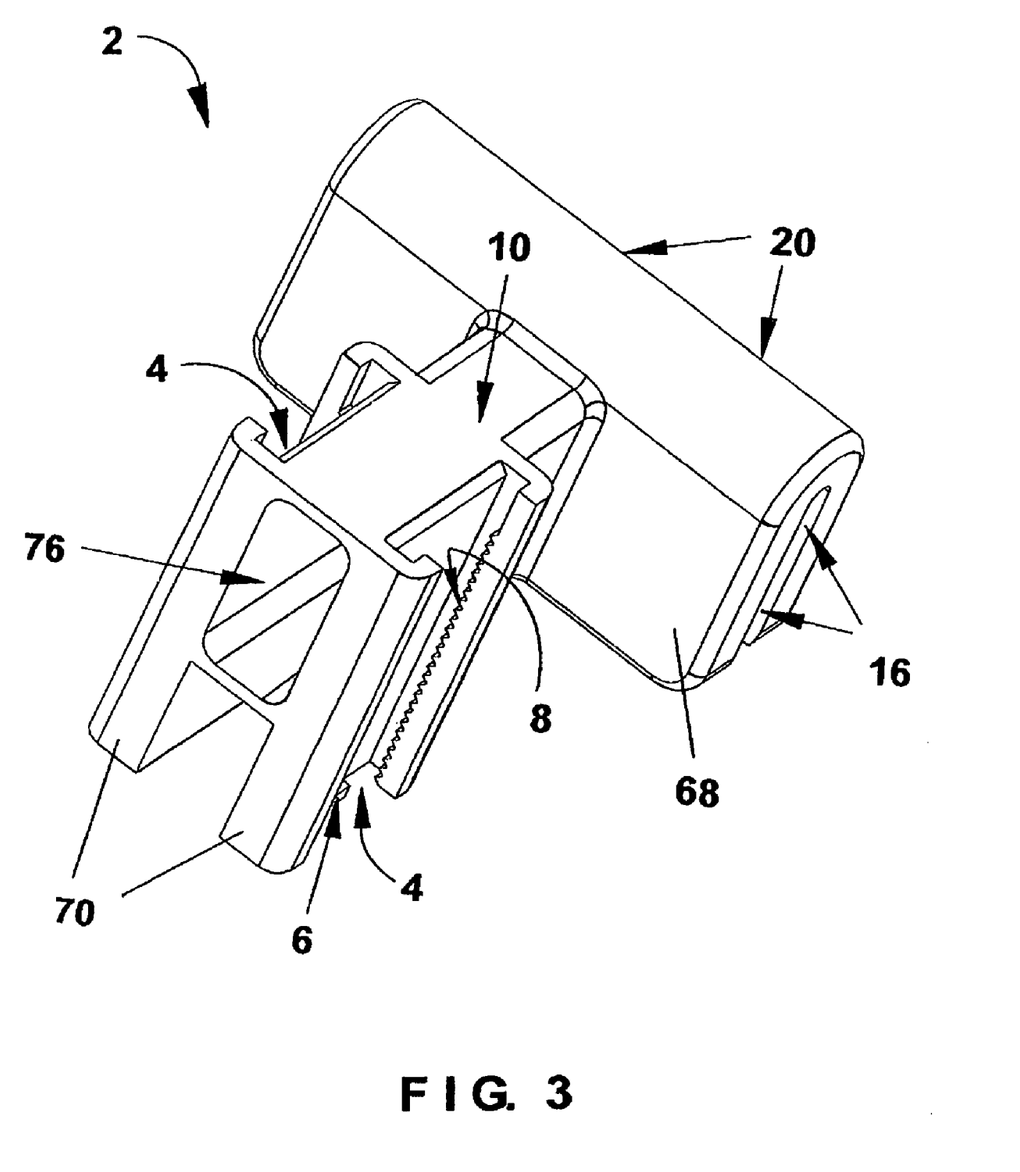
FIG. 3 is a perspective view of the unitary clamping device of the most preferred embodiment of the present invention from a direction opposite to that shown in FIG. 1, which shows the tubular construction of the bridge joining the back-to-back rail plates to one another and to the clamping member, the bridge extending between the two rail plates, and the clamping member having a greater width dimension than the plate-bridge-plate combination, with FIG. 3 also showing a preferred ridged surface that is used adjacent to both the right and left sides of the open-front configuration in the vertically-extending channel of each rail plate (with most of the ridges surfaces remaining hidden in the accompanying illustrations).
Figure 4:
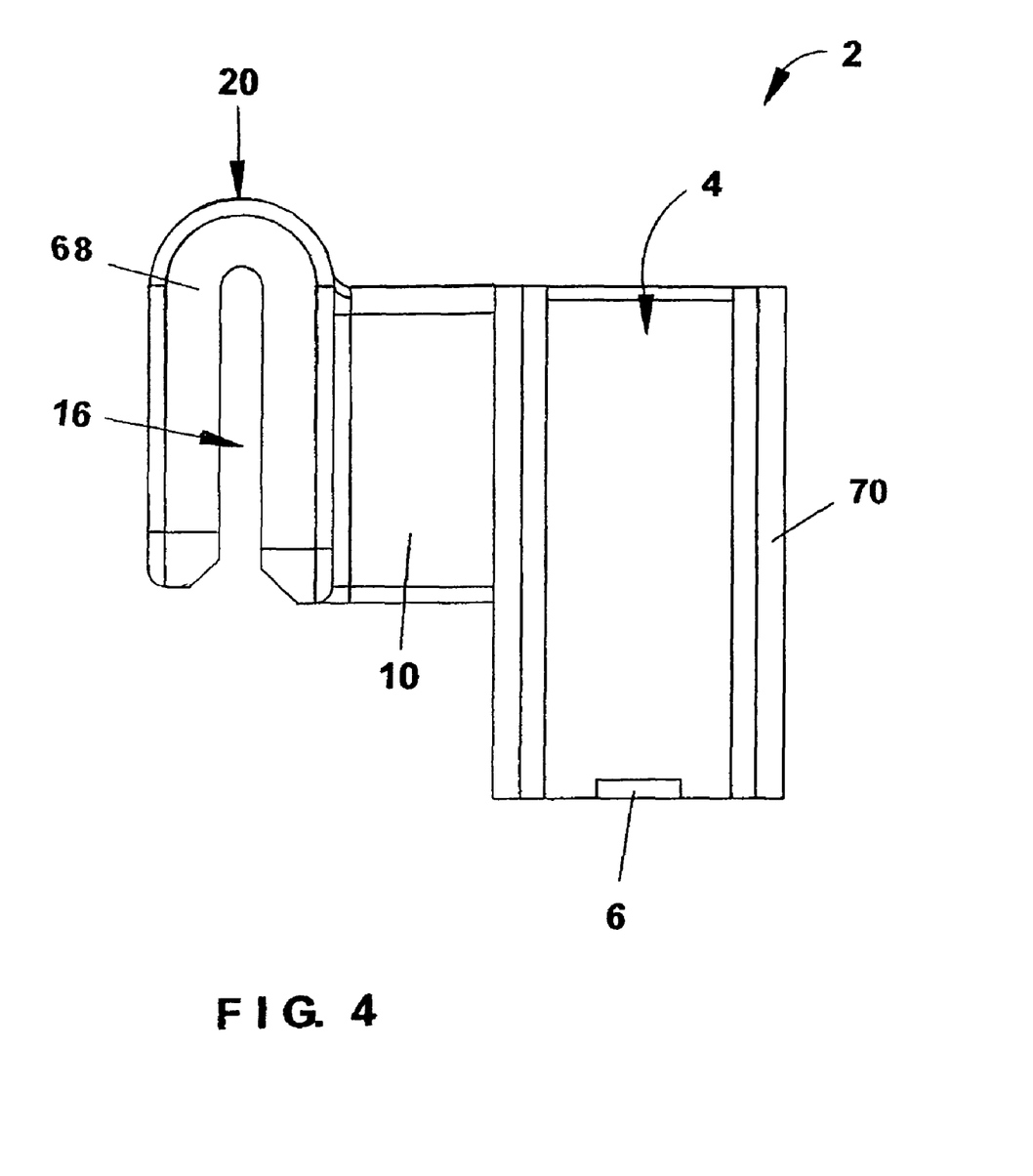
FIG. 4 is a side view of the most preferred embodiment of the present invention having an inverted U-shaped clamping member with a vertically-extending slot, the clamping member connected to one end of a bridge, with the opposed end of the bridge shown next to a rail plate (that is one of two back-to-back rail plates usable for support of a float switch housing very close to a fluid collecting container wall.
Figure 5:
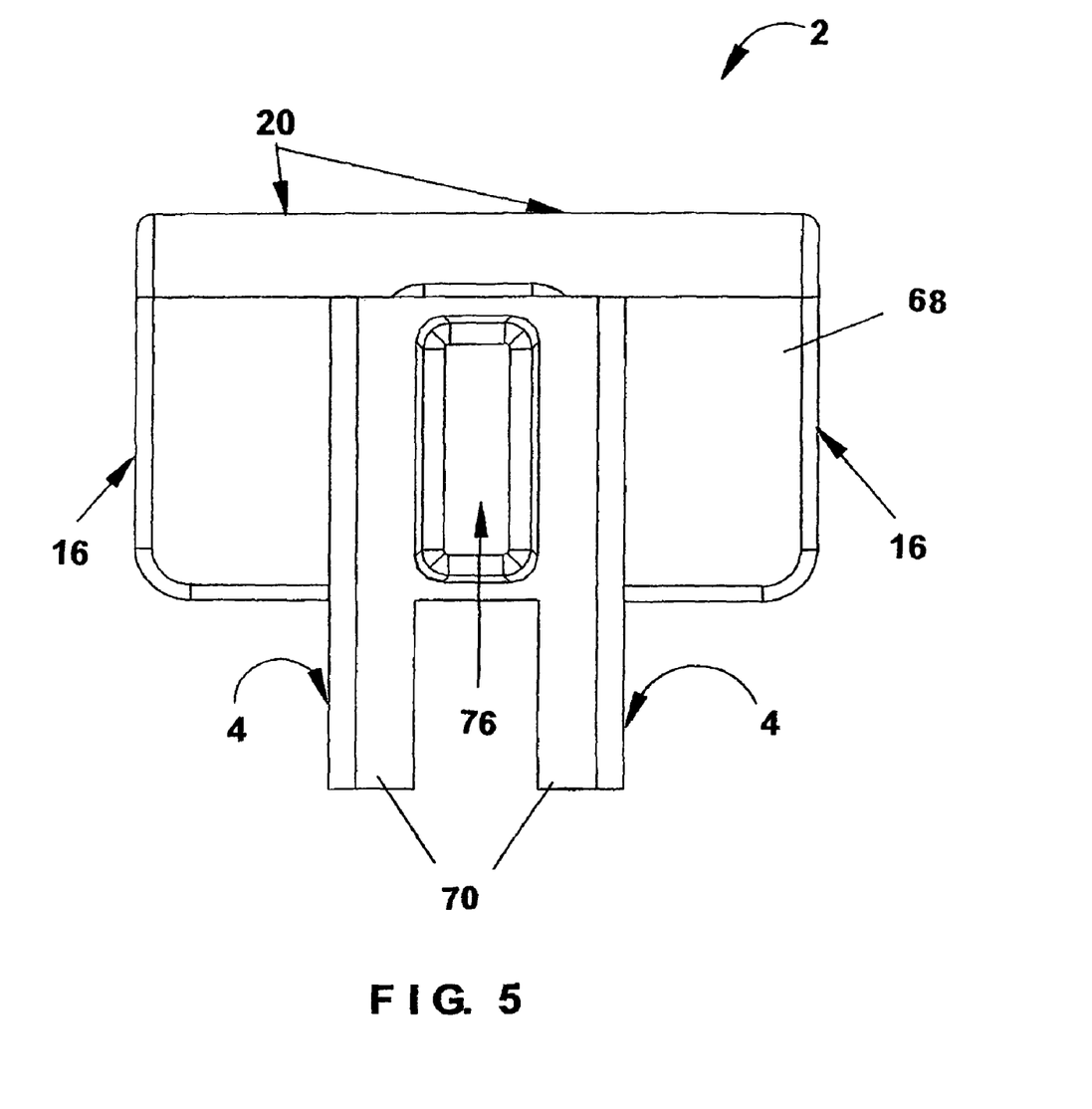
FIG. 5 is an end view of the most preferred embodiment of the present invention with the dual rail plates and bridge shown positioned in front of its clamping member.
Figure 6:
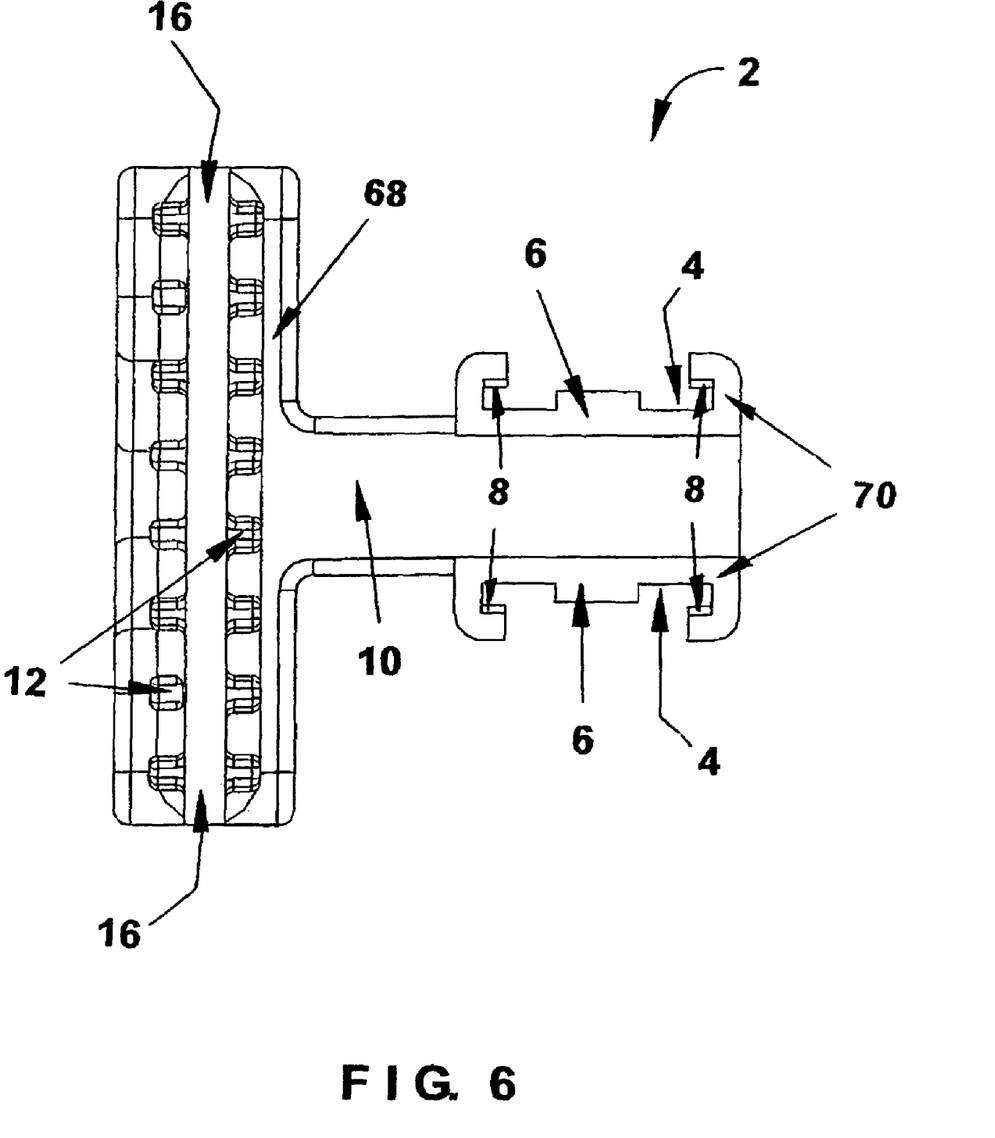
FIG. 6 is a bottom view of the most preferred embodiment of the present invention showing its clamping member associated with one end of a bridge and the opposing end of the bridge extending between two rail plates placed in back-to-back orientation to one another.
Figure 7:
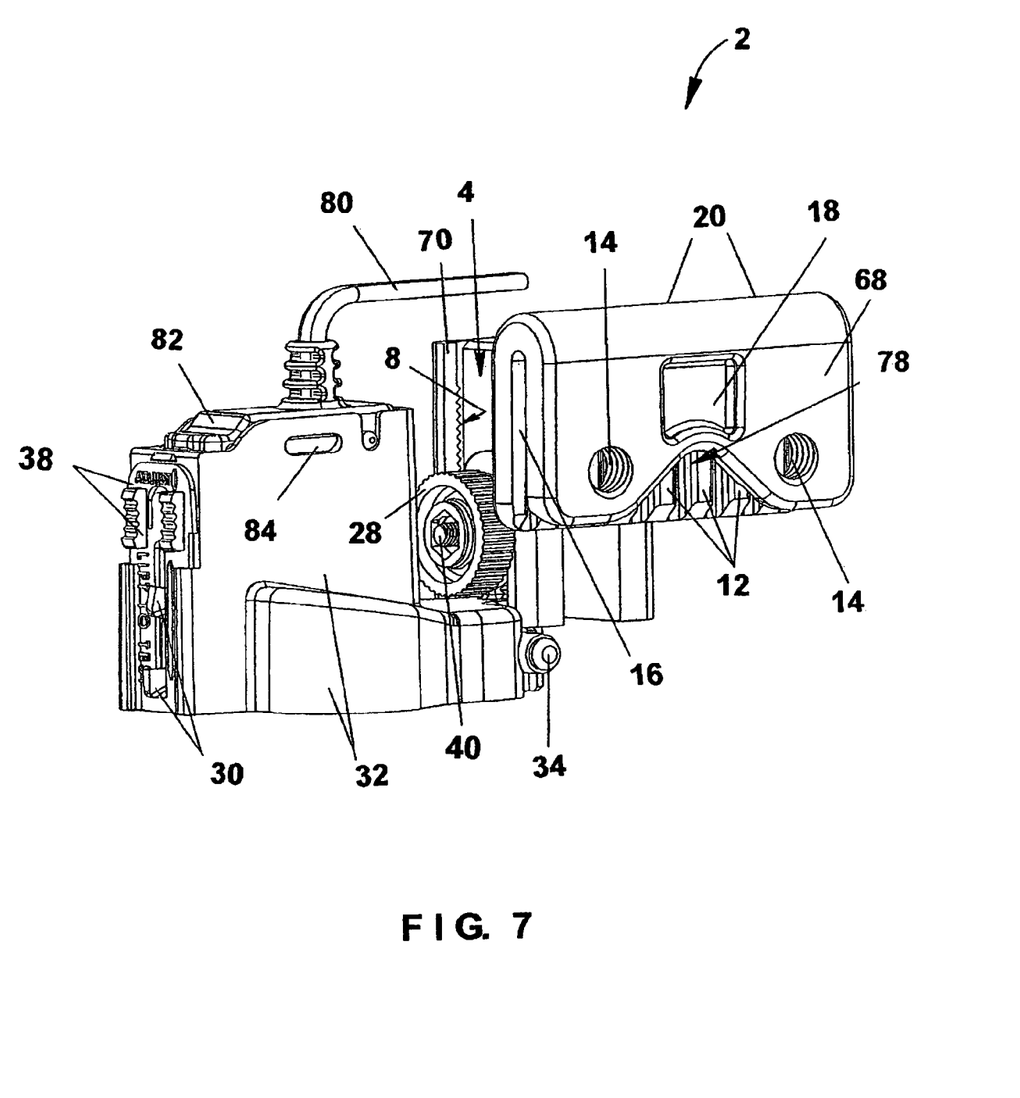
FIG. 7 is a perspective view of the most preferred embodiment of the present invention with a float switch housing connected to the channel in one of its rail plates via a lock-nut.
Figure 8:
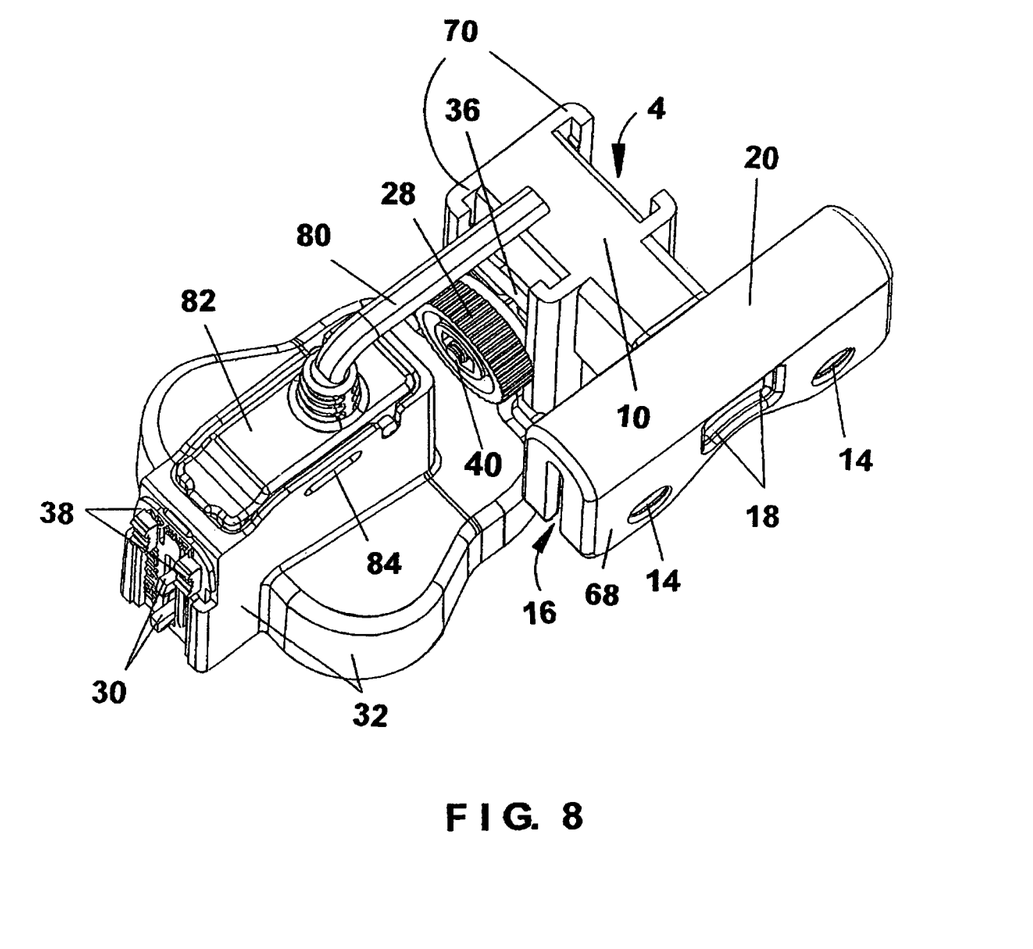
FIG. 8 is a top view of the most preferred embodiment of the present invention with a float switch housing connected to the channel in one of its rail plates via a lock-nut.
Figure 9:
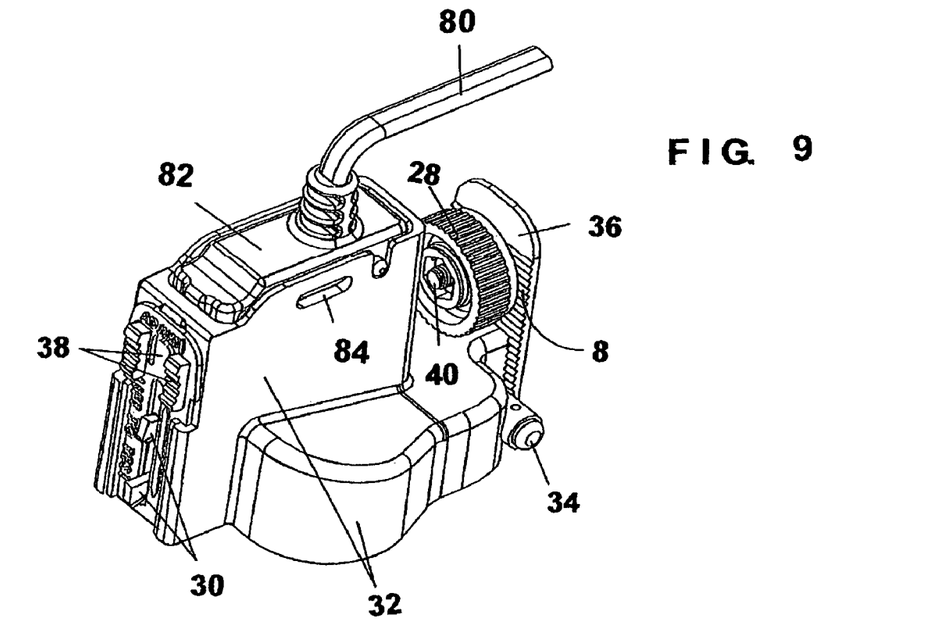
FIG. 9 is a perspective view of a float switch housing that can be successfully used with the most preferred embodiment of the present invention for fluid level monitoring and initiation of fluid-shut-off signal generation, with the float switch housing shown supporting a micro switch in a position above a pivotally-deployed float body.
Figure 10:
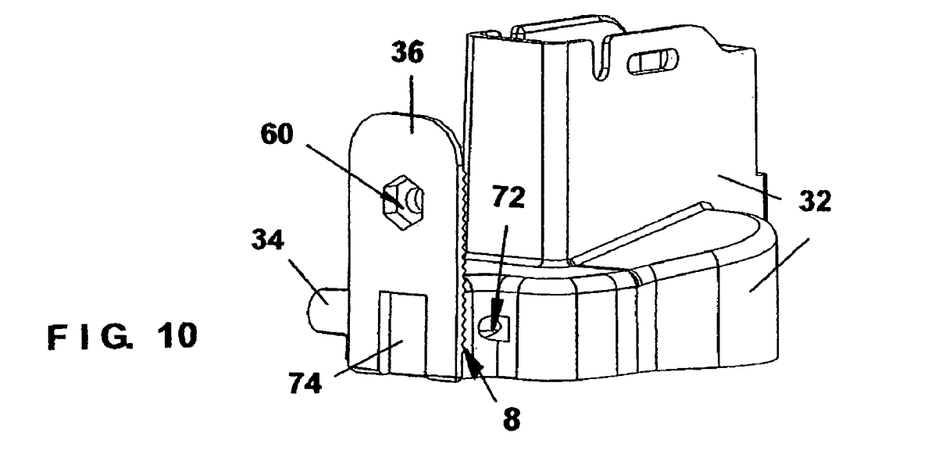
FIG. 10 is a rear view of the rail plate connection member of the float switch housing in FIG. 9 and showing the hex-shaped indentation that holds the head of a fastener used to support the lock-nut employed to secure the rail plate connection member within a rail plate channel, and also showing the rectangular-shaped indentation configured to accommodate the stop associated with the bottom end of each rail plate channel.
Figure 11:
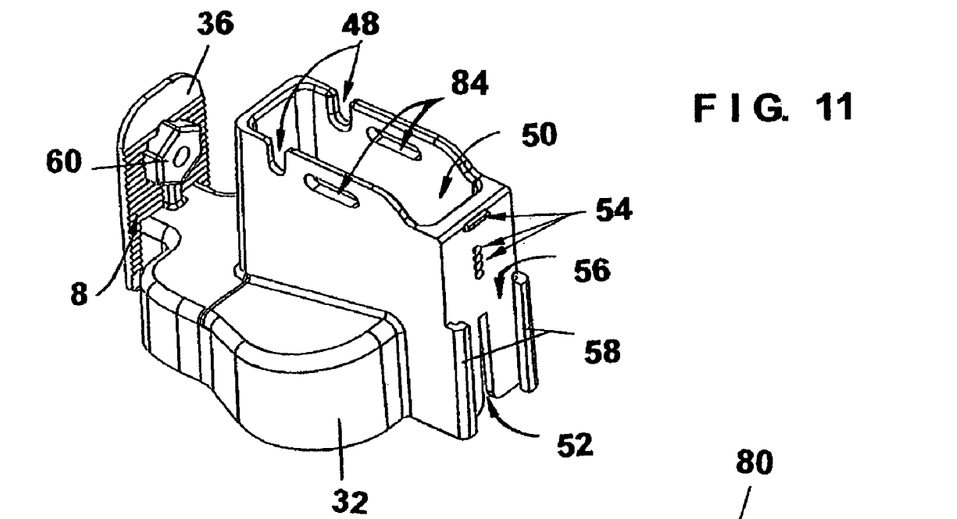
FIG. 11 is a perspective view of a float switch housing that can be successfully used with the most preferred embodiment of the present invention clamping device, with the float switch housing shown having a depending rail plate connection member with structure complementary to that of the present invention rail plate for free vertical movement of the rail plate connection member within the rail plate's channel during periods of time when the lock-nut shown in FIGS. 7 and 8 is loosened/released.

FIGS. 1 and 3-6 show the most preferred embodiment 2 of the present invention clamping device having unitary construction that includes an inverted U-shaped clamping member 68 connected via a bridge 10 to dual rail plates 70, with each rail plate 70 depending from bridge 10 and integral with it so as to form a configuration where each rail plate 70 is placed in a back-to-back orientation with the other rail plate 70 and the bridge 10 extends between them. FIGS. 1, 3, and 6 further show each rail plate 70 having a bottom stop 6, and they also reveal the positioning of at least one of the two ridged surfaces 8 located within the vertically-extending channel 4 of each rail plate 70 (that are hidden from view in many of the accompanying illustrations) and which are also located in opposed positions to one another on opposite sides of the open-front configuration of channel 4. Ridged surfaces 8 are needed in channel 4 for secure adjustable connection of a rail plate connection member therein (such as that marked in FIG. 9 by the number 36), and ridged surfaces 8 also provides a means for incremental height adjustment of the float switch associated with rail plate connection member 36. In contrast, FIG. 2 shows a configuration of fastener 22 (such as a thumbscrew) that can be effectively used to secure clamping member 68 in a fixed position over the top edge of a vertically-extending wall in a fluid collection pan or container (not shown). In addition, FIGS. 4 and 5 respectively show side and end views of the present invention clamping device 2 without a float switch housing 32 attached to either rail plate 70. Furthermore, FIGS. 7 and 8 show a float switch housing 32 connected to one of the present invention rail plates 70, and FIGS. 9-11 show more detailed structure about a float switch housing 32, micro switch 82, and float body 46 that can be successfully used with the present invention clamping device 2 for fluid level monitoring and shut-off signal generation. Thus, while FIGS. 1-8 reveal detailed structure about the most preferred embodiment of the present invention, it is to be understood that many variations in the present invention are possible and also considered to be a part of the invention disclosed herein, even though such variations are not specifically mentioned or shown. As a result, a reader should determine the scope of the present invention by the appended claims.

FIGS. 1-6 show the components of the most preferred embodiment of the present invention from differing directions. FIG. 1 is a perspective view showing the most preferred embodiment of the present invention clamping device 2 comprising a unitary structure that includes an inverted U-shaped clamping member 68 having a vertically-extending slot 16 and a closed top end 20, with the clamping member 68 connected via one end of a bridge 10 to dual rail plates 70, each of which are connected to the opposing end of the bridge 10 in back-to-back orientation to one another with bridge 10 extending between them. FIG. 2 is perspective view of one configuration of short thumbscrew 22 that can be successfully used as a part of the most preferred embodiment 2 of the present invention to securely fix the clamping member 68 over the vertically-extending wall of a fluid collecting container (not shown). FIG. 3 is a perspective view of the most preferred embodiment of the unitary present invention clamping device 2 from the opposite direction seen in FIG. 1, with FIG. 3 showing the tubular configuration of the bridge 10 joining the back-to-back rail plates 70 to one another and to clamping member 68, as well as one of the two ridged surfaces 8 in the channel 4 of each rail plate 70 that are located in opposed positions from one another adjacent to the right and left sides of the open-front configuration of channel 4. In contrast, FIG. 4 is a side view of the most preferred embodiment 2 of the present invention having an inverted U-shaped clamping member 68 with a vertically-extending slot 16, and the clamping member 68 connected to one end of bridge 10. FIG. 4 also shows one of the two present invention rail plates 70 depending from the opposed end of bridge 10. Furthermore, FIG. 5 is an end view of the most preferred embodiment 2 of the present invention with the dual rail plates 70 and bridge 10 shown positioned in front of clamping member 68, while FIG. 6 is a bottom view of the most preferred embodiment 2 of the present invention showing clamping member 68 associated with one end of bridge 10 and the opposing end of bridge 10 extending between two rail plates 70 placed in back-to-back orientation to one another. FIGS. 1 and 3-6 illustrate the unitary and sturdy construction of the most preferred embodiment 2 of the present invention, as demonstrated by the width dimension for clamping member 68 exceeding the thickness dimensions of the plate 70-bridge 10-plate 70 combination, with the sturdy construction exhibited facilitating and expediting present invention installation, and also providing strong sturdy connections for level and stable positioning of a float switch housing 32 that allows reliable float body 46 (see FIG. 12) deployment in response to rising fluid beyond a pre-determined threshold level considered safe and results in generation of a fluid production shut-off signal. Thus, as shown by a two-headed arrow in FIG. 12, when float body 46 pivots upwardly within float switch housing 32 in response to rising fluid (not shown), the interaction between a large magnet 62 associated with float body 46 and a smaller magnet 66 associated with a micro switch 82 also supported by float switch housing 32, causes micro switch 82 to send a shut-off signal to the source of fluid production (not shown) to stop fluid flow into an associated fluid collection pan or other fluid collecting container (not shown).

FIG. 1 also shows the back-to-back positioning of the rail plates 70, which causes any float switch housing (such as the housing 32 in FIG. 11) connected to either one of the two rail plates 70, to extend outwardly therefrom in parallel orientation to the wall supporting clamping member 68 connected via bridge 10 to the upper portion of rail plates 70. In this parallel configuration, a lateral portion of the pivotally-deployable float body 46 supported within float switch housing 32 becomes located very close to the fluid collecting container's wall (not shown), often being less than one-half inch away from it. Such parallel orientation is in direct contrast to the perpendicular orientation relative to a pan or container wall that typically results when prior art means of wall attachment are used, and which would cause the pivoting end 44 (also referred to elsewhere herein as pivoting axis 44) of the float body 46 to become located adjacent to the supporting wall, leaving the opposed upwardly-deployable end 30 of the float body 46 to become located in a position farthest from the wall (where it is often more than three inches away from corner fluid accumulation in a tilted fluid collecting container and unable to monitor/react to it and provide prompt fluid shut-off signal generation). Conversely, the back-to-back positioning of the present invention rail plates 70, as shown in FIG. 1 of the accompanying illustrations and also illustrated clearly in FIG. 8, can place a lateral portion of the deployable end 30 of float body 46 within one-half of an inch from the interior surface of the pan wall extending through the slot 16 in clamping member 68. FIG. 1 further shows the vertically-extending channel 4 downwardly through the near rail plate 70, the ridged surface 8 on the left side of the open-front configuration of channel 4 in a position remote from the bridge 10 behind it, and the stop 6 associated with the bottom end of channel 4 (which engages the rectangular indentation 74 shown in FIG. 10 on the rail plate connection member 36 when it is secured in channel 4 via the lock-nut 28 shown in FIGS. 7 and 8 and used to securely fix a float switch housing 32 to one of the two present invention rail plates 70). Although FIG. 1 only shows one interior ridged surface 8 within channel 4, as can be seen in FIG. 6, it is contemplated for two internal ridged surfaces 8 to be present in both of the back-to-back rail plates 70, with one ridged surface 8 being located on each of the opposing sides of stop 6. Furthermore, although FIG. 7 shows ridged surface 8 extending from the bottom end of rail plate 70 to a position near the open top end of rail plate 70, and this length of ridged surface 8 is preferred, the length of ridged surface 8 can be different from that shown in FIG. 1.

FIG. 1 also shows a bridge 10 extending between rail plates 70 and connecting rail plates 70 to a clamping member 68. FIG. 1 further shows two threaded openings 14 (preferably horizontally-extending but not limited thereto) extending through the portion of the inverted U-shaped configuration of clamping member 68 that is located remotely from bridge 10. Although not identified by numerical reference, one can see that the longitudinal axis of bridge 10 is in perpendicular orientation to that of the channel 4 in each rail plate 70. Also, one can further see that the height dimension of both rail plates 70 exceeds that of bridge 10, which allows each of the back-to-back oriented rail plates 70 to extend below bridge 10. Thus, the upper portion of each rail plate 70 outwardly depends from a different side of bridge 10, and the opposed lower portions of both rail plates 70 that extend below bridge 10 have no additional connection to bridge 10 or to each other. The relative height dimensions of each rail plate 70 and bridge 10, as shown in FIG. 1, should not be considered limiting as long as rail plates 70 provide the height adjustment capability needed for float body 46 in an intended application. In addition to showing the two horizontally-extending threaded openings 14 extending through the inverted U-shaped configuration of clamping member 68, FIG. 1 also shows the inverted U-shaped configuration of clamping member 68 having a vertically-extending slot 16 and a closed top end 20. Although two threaded openings 14 in most applications of the present invention clamping device 2 are adequate for securely mounting clamping member 68 over the top edge of a fluid collecting container wall (not shown), the present invention clamping device 2 is not limited to the use of only two threaded openings 14. Furthermore, FIG. 1 shows clamping member 68 having a void area 78 between the two threaded openings 14, a vent opening 18 above void area 78, and no cutout area through ribs 12 leading to bridge 10. Void area 78 and vent opening 18 both save material cost during the manufacture of clamping member 68 without compromising its strength, with vent opening 18 also allowing facilitated air exhaust from slot 16 when the wall of a fluid collecting container (not shown) is placed within slot 16 and also as thumbscrews 22 are secured within threaded openings 14 to draw clamping member 68 tightly against the fluid collecting container's wall to establish a secure fixed connection between them. The number, configuration, dimension, and spaced-apart positioning of ribs 12 shown in FIG. 1 is not limiting as long as connecting member 68 still effectively performs its intended function. Although FIG. 1 shows clamping member 68, bridge 10, and rail plates 70 having no surface texture, it is contemplated for each to have any texture or decorative enhancement that does not interfere with its function.

FIG. 2 shows a preferred embodiment of a thumbscrew 22 that can be successfully used with the most preferred embodiment 2 of the present invention to secure clamping member 68 into a fixed position over the top edge of a fluid collecting container (not shown). Although the use of hand-tightened thumbscrews 22 is preferred in the present invention clamping device 2 for ease and convenience, other conventional fastening means (not shown) can also be used. Furthermore, the number of thumbscrews 22 used, as well as their size and relative positioning to one another, are not critical as long as secure attachment of clamping member 68 into its desired position of use is achieved to indefinitely sustain float body 46 in its originally established level orientation relative to a supporting fluid collection pan or other fluid collecting container (not shown) for reliable and repeated fluid level monitoring with little or no maintenance or inspection. FIG. 2 shows thumbscrew 22 having a threaded end 26, an enlarged head 24, and a shortened configuration without any non-threaded area between threaded end 26 and enlarged head 24. Although it is preferred for enlarged head 24 to be oversized for easy hand-manipulation while thumbscrews 22 are used to tighten clamping member 68 over the upper edge of a fluid collection pan or other fluid collecting container (not shown), the configurations of head 24 and threaded end 26 shown in FIG. 2, as well as the lack of any non-threaded area between threaded end 26 and enlarged head 24, should only be considered as illustrative and not limiting. As long as the thumbscrews 22 used are easily gripped and manipulated for prompt connection of the preferred embodiments of clamping device 2 to a fluid collection pan or other fluid collecting container, any desired size, shape, location, and surface texture for thumbscrew 22 can be considered within the scope of the present invention. However, in determining the size, number, shape, location, and/or surface texture of the thumbscrews 22, used as a part of the present invention clamping device 2, as in all aspects of present invention structure and design, it is preferred that the material cost relating thereto only be increased where additional benefit is derived.

FIGS. 3-6 show the present invention 2 from differing vantage points. In the view shown in FIG. 3, which is from the opposed direction as the view shown in FIG. 1, the second ridged surface 8 within channel 4 in the near rail plate 70 is shown, and also shown to extend from the bottom end of rail plate 70 near stop 6 to a position close to the top end of rail plate 70, similar to the configuration for the first ridged surface 8 shown in FIG. 1. Extension of ridged surface 8 adjacent to the majority of the open-front configuration of each rail plate 70 is preferred, although not critical, as it allows more vertical adjustment capability for an attached float body (such as that shown in FIG. 12 and marked by the number 46). FIG. 3 also shows the top closed end 20 of the inverted U-shaped configuration of clamping member 68, which in combination with the views of FIGS. 4 and 6 confirms that slot 16 is open-sided on both of its sides and open-ended only on its bottom end. In addition, FIG. 3 better reveals the preferred relationship between back-to-back rail plates 70 and bridge 10, wherein only the top portions of the back-to-back rail plates 70 are connected to bridge 10. FIG. 3 also shows the tubular structure of bridge 10, with its preferred wall thickness defined by the end opening 76 visible between back-to-back rail plates 70. Although FIG. 3 shows the slot 16 in clamping member 68, none of the vertically-extending ribs 12 preferably adjacent to both sides of slot 16 are visible. Further, as shown in FIG. 3, and confirmed by the side view of FIG. 4, the closed top end 20 of clamping member 68 preferably extends above the top ends of bridge 10 and rail plates 70, and the open end of slot 16 preferably extends only to the bottom end of bridge 10, with the portion of inverted U-shaped clamping member 68 remote from bridge 10 that defines one side of slot 16 being slightly shorter than the side of inverted U-shaped clamping member 68 associated with bridge 10. FIG. 4 similarly shows clamping member 68 having a slot 16 with a closed top end 20 that forms clamping member 68 into its inverted U-shaped configuration. In addition, FIG. 4 shows bridge 10 connected between clamping member 68 and a rail plate 70 comprising a bottom stop 6 and a vertically-extending channel 4. Although it is contemplated for interior ridged surfaces 8 to be present within channel 4 on both sides of the open-front configuration of channel 4, ridged surfaces 8 are hidden in the view shown in FIG. 4. FIG. 5 similarly shows rail plates 70 separated by the portion of bridge 10 surrounding its end opening 76, as well as rail plates 70 extending below the bottom edge of clamping member 68. In contrast, FIG. 5 shows the closed top end 20 of clamping member 68 extending above the top edges of the two rail plates 70. FIG. 5 also shows the preferred dimension of end opening 76 between rail plates 70, which substantially fills the space between rail plates 70. However, it is not contemplated for the dimension of end opening 76 to be limited to that shown in FIG. 5. Also, to enhance its stability for association with fluid collection pans and other fluid collecting containers having an insubstantial construction, the most preferred embodiment of clamping member 68 is shown to have a width dimension nearly twice that of the plate 70-bridge 10-plate 70 combination. In the bottom view of FIG. 6, the ridges 12 in clamping member 68 facing slot 16 are clearly shown on both sides thereof, as preferred, and slot 16 extending in both directions fully through the sides of clamping member 68. However, FIG. 6 does not reveal the concave/void area 78 shown in FIGS. 1 and 7 on the side of the inverted U-shaped configuration of clamping member 68 remote from bridge 10. FIG. 6 further shows bridge 10 separating back-to-back rail plates 70 from one another, and each rail plate 70 comprising a bottom stop 6 and one ridged surface 8 on each side of channel 4 on the interior surface of channel 4 remote from bridge 10. To best provide a non-slip gripping connection between rail plate connection member 36 and rail plate 70 when lock-nut 28 is tightened against the outer surface of a rail plate 70, it is preferred for the ridged surfaces 8 on each rail plate 70 to fully extend from both edges of the open-front configuration of channel 4 to the adjacent front corner of rail plate 70. Stop 6 is also shown in FIG. 6 to be substantial in width and preferably extending across at least half of the width of each rail plate 70 in the most preferred embodiment of the present invention clamping device 2, although it is not contemplated for stop 6 to be limited to the relative size or configuration shown in FIG. 6.

FIGS. 7 and 8 respectively show a float switch housing 32, the deployable end 30 of a float body 46 (the remainder of float body 46 is not visible in FIGS. 7 and 8, but can be seen in FIG. 12), and micro switch 82 as they would be associated with the most preferred embodiment of the present invention clamping device 2 while it is supported by the vertically-extending wall of a fluid collection pan or other fluid collecting container (not shown). FIGS. 7 and 8 show float switch housing 32 attached to a rail plate connection member 36 (shown in more detail in FIGS. 8-11) to one of the rail plates 70 of clamping device 3 that is integral to the portion of float housing 32 adjacent to the pivotal connection of float body 46 within float switch housing 32 provided by the pivot pin connection 34. A common threaded fastener 40 and a lock-nut 28 having internal threading (not shown) complementary to the external threads of fastener 40, as well as an easily hand-manipulated grooved outer surface (visible but not separately numbered) are used to raise and lower rail plate connection member 36 relative to rail plate 70 and establish fixed positioning between the rail plate connection member 36 and one of the two rail plates 70 after float body 46 has been elevated or lowered to the height needed for effective operation. FIGS. 9-11 further shows rail plate connection member 36 having a ridged surface 8 in a position that allows it to engage the complementary ridged surfaces 8 present on each of the two rail plates 70. It is the engagement of the complementary ridged surfaces 8 on both rail plate 70 and rail plate connection member 36 that permits accurate incremental raising and lowering of float switch housing 32 relative to an associated pan or other fluid collecting container (not shown) for placement of its internally secured float body 46 (see FIG. 12) at the exact threshold height needed for promptly stopping fluid production when the depth of the accumulated fluid being monitored exceeds the threshold level considered safe. Lock-nut 28 is preferably oversized to be easily and simply loosened by hand-manipulation for height adjustment of float switch housing 32 relative to an associated fluid collection pan or other fluid collecting container, and then easily and promptly re-tightened after an appropriate upward or downward adjustment is made. FIG. 10 shows the hex-shaped indentation 60 that is employed for housing the head of fastener 40 so that it does not interfere with the vertical movement of rail plate connection member 36 within the channel 4 of one of the two rail plates 70. Although FIG. 10 shows indentation 60 having a hex-shaped configuration, other configurations (such as but not limited to a square or an octagon) can also be used. FIGS. 7 and 8 also show the positioning of a micro switch 82 within the top portion of float switch housing 32 as secured in place by snap-fit connection 84, and micro switch 82 having upwardly directed electrical wiring 80 used to connect micro switch 82 to the fluid producing unit (not shown) responsible for directing condensate or other fluid into the associated pan or other fluid collecting container to which the present invention clamping device 2 is connected. In addition, FIGS. 7 and 8 show a test plate 38 associated with float switch housing 32 for determining that the float body 46 (housed within housing 32 and hidden from view in FIGS. 7 and 8) is capable of proper operation, the deployable end 30 (usable as a test lever) of float body 46 (see FIG. 12 for an enlarged view) in two positions (an upward/deployed position and a lowered/non-deployed position), the snap-fit connection 84 between micro switch 82 and float switch housing 32 that keeps the micro switch 82 firmly secured to float switch housing 32 for stable positioning of the float body 46 relative to micro switch 82 for reliable shut-off signal production when needed, and the pivot pin connection 34 for float body 46 that allows it to move between its upward/deployed position and its lowered/non-deployed position within float switch housing 32. FIG. 8 further shows float switch housing 32 having a wide lower portion with a configuration complementary to that of the float body 46 shown in FIG. 12, wherein it is intended for float body 46 to substantially fill the lower portion of float switch housing 32 for improved responsiveness during fluid level monitoring. FIG. 8 further shows the widest part of float switch housing 32 positioned very close to slot 16 and the vertically-extending wall contemplated for insertion into slot 16 when clamping member 68 is secured into its preferred position of use, which means that a lateral portion of float body 46 would also be placed very close to the vertically-extending wall where it could effectively monitor fluid depth in the lowermost corner of a tilted fluid collecting container. FIGS. 7 and 8 also show the most preferred embodiment of clamping member 68 having to threaded openings 14, and concave/void area 78 between openings 14, and a vent 18 above void area 78. Although FIGS. 7 and 8 also show the present invention clamping device 2 connected to float switch housing 32, nothing is revealed about clamping device 2 that has not already been shown in FIGS. 1, and 2-6.

Figure 12:
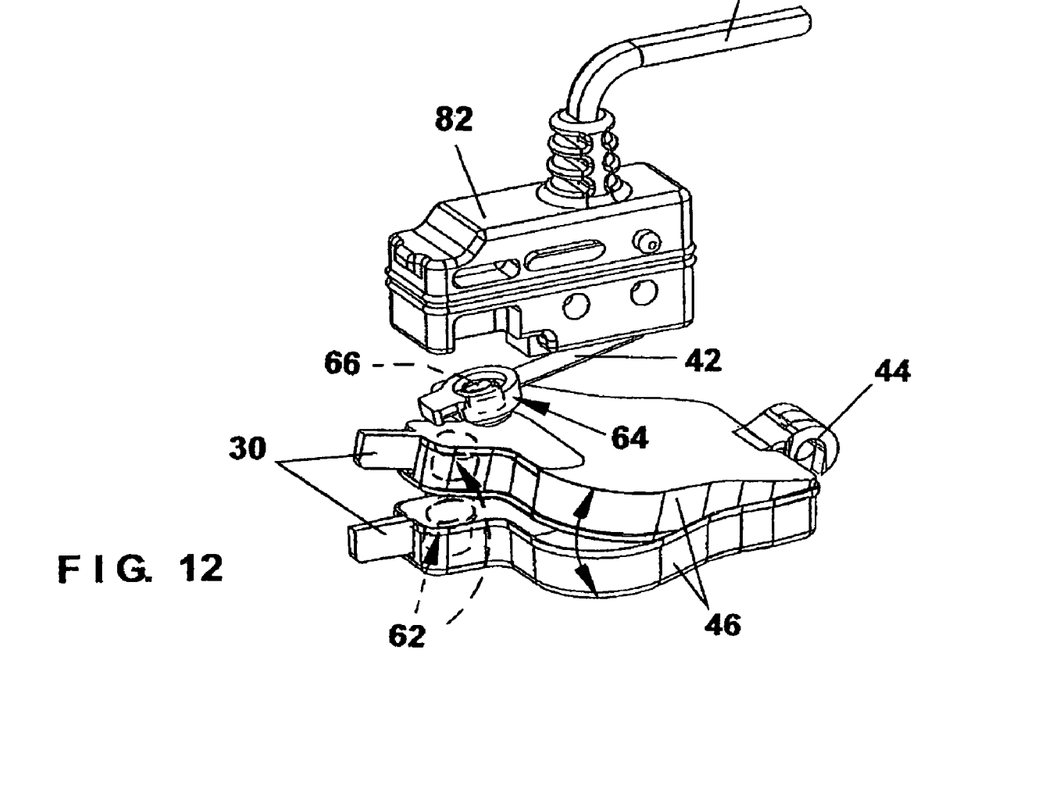
FIG. 12 is a perspective view of preferred embodiments of a micro switch and a float body that can be successfully used with float switch housing in FIG. 10 and the most preferred embodiment of the present invention clamping device, with the micro switch shown located above the float body in a position simulating that experienced during actual use, so that the larger magnet associated with the float body during its upward deployment is able to successfully interact with the smaller magnet associated with the arm downwardly depending from the micro switch, and thereby activate the micro switch to send a shut-off signal to stop fluid production.

FIGS. 9-12 show more detail about the float switch housing 32, float body 46, and micro switch 82 that are most preferred for use with the preferred embodiments of the present invention clamping device 2. Since FIG. 9 shows float switch housing 32 separated from the present invention rail plate 70 shown in FIGS. 7 and 8, the preferred structure for rail plate connection member 36 and its ridged surface 8 are more clearly shown, as well as their preferred positions relative to the remainder of float switch housing 32, and in particular the area neat pivot pin connection 34. FIG. 9 does not reveal any new structure for float switch housing 32, fastener 40, and lock-nut 28 that has not already been revealed in FIGS. 7 and 8. FIG. 10 shows a rear view of rail plate connection member 36 and the hex-shaped indentation 60 used for holding the head of fastener 40 away from the interior of channel 4 to allow for free movement of rail plate connection member 36 within channel 4 when lock-nut 28 is loosened for float body 46 height adjustment or to remove rail plate connection member 36 from channel 4. FIG. 10 also shows the rectangular-shaped indentation 74 used for accommodating the shape of the stop 6 on a rail plate 70 and an air vent 72 through float switch housing 32 that prevents airlock malfunction of float body 46 during its deployment. Although not shown, it is contemplated that at least one other airlock-preventing vent 72 would be associated with the lower portion of float switch housing 32, perhaps in a position hidden behind rail plate connection member 36. The component with the number 34 in FIG. 10 represents the pivot pin connection 34 used between float switch housing 32 and the pivoting axis 44 for float body 46 (shown in FIG. 12 in a remote position from deployable end 30). FIG. 11 shows float switch housing 32 having an upper opening/chamber 50 for use in holding the micro switch 82 shown in FIG. 12 so that electrical wiring 80 connected to micro switch 82 can be connected to a fluid-producing unit (not shown) for sending a shut-off signal to the fluid producing unit when the depth of fluid collected in a fluid collection pan or other fluid collecting container to which float body 46 is connected exceeds a pre-determined level considered safe. FIG. 12 also shows float body 46 in two positions (one above the other), with the lower position being a non-deployed position wherein no shut-off signal is sent, and the higher position being a deployed position that activates micro switch 82 to generate and send a fluid production shut-off signal. The two-headed (generally vertical and arcuate) arrow on the near side of float body 46 in. FIG. 12 indicates the bi-directional movement intended for float body 46 during its use. FIG. 12 also identifies the pivoting axis 44 on one end of float body 46, and the deployable end 30 (also mentioned herein below and elsewhere in this disclosure for its optional use as a test lever) in a position on float body 46 opposed to that of axis 44, that during installation, inspection, and maintenance activity can be used to manipulate and confirm whether micro switch 82 is properly functioning at the pre-determined depth of fluid accumulation considered safe. In addition, FIG. 12 shows micro switch 82 having a downwardly-extending arm 42 and a cup 64 on the distal end of arm 42, with a small magnet 66 positioned within cup 64 and located immediately above the larger magnet 62 shown within float body 46. The positioning of micro switch 82 and float body 46 shown in FIG. 12 is similar to that existing when both are held within their positions of use by float switch housing 32. As rising fluid raises float body 46 into its elevated/deployed position, the larger magnet 62 within float body 46 will open or close micro switch 82 (as needed) so that micro switch 82 sends a shut-off signal to the unit (not shown) responsible for the rising fluid. FIG. 11 shows the lower portion of float switch housing 32 having a generally butterfly-shaped configuration similar to that of the float body 46 shown in FIG. 12, indicating that float body 46 should substantially fill the lower portion of float switch housing 32 to keep airborne debris (not shown) from preventing the proper and uninhibited vertical deployment of float body 46 within float switch housing 32. FIG. 11 further shows float switch housing 32 preferably having guides 48 for easy alignment of micro switch 82 during its insertion into upper chamber/opening 50. In addition, FIG. 11 shows a preferred vent opening 52 in the front portion of float switch housing 32 where a test plate 38 can be attached (such as that shown in FIGS. 7-9) which prevents airlock malfunction in float body 46 during any upward deployment (in combination with any air vent 72 also in float switch housing 32, as shown in FIG. 10). FIG. 11 further shows the front portion of float switch housing 32 having lateral guide bars 58 that form a slot/channel 56 into which a test plate 38 (shown in FIGS. 7-9) can be inserted, and the protrusions 54 that help to secure a test plate 38 into its preferred position of use after initial insertion into slot/channel 56. In addition, FIG. 11 shows float switch housing 32 having an integral rail plate connection member 36 with a central hex-shaped protrusion/indentation 60 (the rearward indentation of which holds/accommodates the hex-shaped head of the threaded fastener 40 shown in FIG. 9 to allow free vertical movement of rail plate connection member 36 within channel 4), as well as a ridged surface 8 that engages a complementary ridged surface 8 (see FIG. 1) formed into rail plate 70 adjacent to the open-front configuration of the channel 4. When the electrical wiring 80 extending from micro switch 82 is connected into the circuit of the unit or system generating the fluid to be collected in the fluid collection pan or other fluid collecting container to which preferred embodiment clamping device 2 is attached, rising fluid accumulating in the pan or container will cause the associated float body 46 to similarly rise, and when the depth of the collected fluid reaches a pre-determined height no longer considered safe, the circuit of the system or unit will either be interrupted or completed so as to suspend the generation of additional fluid.

The materials from which the most preferred embodiment 2 is made can vary, but must be impervious to corrosion. Preferably for cost considerations, although not limited thereto, it is contemplated for clamping member 68, thumbscrews 22, fastener 40, and lock-nut 28 to all be made from plastic. Resistance to UV radiation is not necessarily a contemplated feature of the present invention, unless dictated by the application. Manufacture of present invention clamping device 2 components could be accomplished by blow molding, injection molding, assembly of pre-formed individual components, or a combination thereof, with the choice of manufacturing being determined by the anticipated purchase cost to consumers and the expected duration of use without maintenance, parts replacement, and/or repair. Although size of the present invention clamping device 2 is not critical, for many condensate collection applications, the length, width, and height dimensions of the present invention clamping device 2 would each be less than a dimension of approximately three inches.

To facilitate and expedite installation of the present invention clamping device 2 in its preferred position of use over the top edge of a fluid collection pan or other fluid collecting container, thumbscrews 22 could already be attached to clamping member 68 by partial insertion into threaded openings 14. Thus, it is contemplated that all an operator/installer (not shown) would have to do at the time of installation to provide stable positioning of a clamping member 68 against the wall supporting it, is place the slot 16 of clamping member 68 over the top edge of the wall of a fluid collection pan or other fluid collecting container (not shown) until the top edge reaches the closed top end 20 of slot 16, and then tighten each thumbscrew 22 until clamping member 68 becomes firmly fixed against the wall supporting it. No drilling of holes through the upstanding wall of the supporting fluid collection pan or other fluid collecting container is required for clamping member 68 installation. Also, once clamping member 68 is in its secured and usable position, and float switch housing 32 is connected to rail plate 70, an installer or operator would check float body 46 (using its deployable end 30 as a test lever) to confirm that it has the stable and level positioning required for reliable and uninhibited vertical movement, and that it is operable at the appropriate fluid depth for successful overflow-prevention function. Electrical wiring 80 extending from micro switch 82 would then be connected to the system providing water or other fluid to the fluid collection pan or other container supporting the present invention clamping device 2. Thereafter, when the associated pan or other fluid collecting container accumulates beyond a pre-determined depth considered safe to prevent overflow/damage, the present invention float body 46 is raised by the rising fluid to the height that causes micro switch 82 to send a shut-off signal to interrupt fluid production. Minimal maintenance, monitoring, and inspection of the present invention clamping device 2 is contemplated. Furthermore, if float switch housing 32 is made from translucent, transparent, or partially transparent materials, an installer or operator could visibly assess the effective operation of float body 46 without removing it from its position of use or separating float switch housing 32 from its associated rail plate 70. Design considerations for clamping member 68, rail plates 70, bridge 10, and thumbscrews 22 include but are not limited to price point, ease of manufacture, and effectiveness of operation. It is further contemplated for the present invention clamping device 2 to have a generally compact design and construction for efficient packaging and transport.

I claim:

1. A clamping device for use in association with a fluid collecting container having a vertically-extending wall with a top edge, and for securely mounting a float switch housing and micro switch in a variety of fixed locations relative to the wall, so that when fluid accumulating in the container exceeds a predetermined depth considered safe, the deployable end of a float body pivotally secured within the housing will be raised a sufficient amount to activate the micro switch and cause it to generate a shut-off signal that is then sent to the system providing fluid to the container to stop fluid production, said clamping device comprising:

unitary structure having a clamping member connected via a bridge to two rail plates positioned in back-to-back orientation one to the other, said bridge having opposing ends and said clamping member depending from one of said opposing ends in perpendicular association with said bridge, said two rail plates depending from the other of said opposing ends of said bridge in a position where a portion of said bridge extends between said two rail plates;

said clamping member having an inverted U-shaped configuration, an open-ended slot extending vertically through said inverted U-shaped configuration, and at least two threaded openings extending through the portion of said inverted U-shaped configuration remotely located from said bridge, said open-ended slot also having a closed top end, and said threaded openings also being configured and positioned for communication with said slot;

each said rail plate having a vertically-extending channel with an open top end, said channel also having an open-front configuration facing away from the other one of said rail plates; and at least two fasteners each having threads configured for allowing secure engagement with a different one of said threaded openings associated with said clamping member, so that when said clamping member is positioned over the top edge of the vertically-extending wall of a fluid collecting container with said slot aligned with the top edge, and said bridge and said two rail plates are also placed into an orientation where they will be located within said fluid collecting container when said clamping member attains its desired position of use relative to the wall, and subsequently when said clamping member is lowered over the wall's top edge so that the top edge becomes inserted into said slot and lowering continues until the wall's top edge comes into contact with said closed top end of said slot and a portion of the wall below the top edge also becomes positioned within said slot, said at least two fasteners can each be advanced through a different one of said threaded openings in said clamping member until contact is made with a portion of the wall within said slot, with said at least two fasteners thereafter being tightened to fix said clamping member securely against the wall, and then if a float switch housing having a pivotally-deployable float body is placed in fixed association with said vertically-extending channel of one of said rail plates, the housing attains a parallel orientation to the wall that positions a lateral portion of the deployable end of the float body close to the wall, wherein even a small amount of fluid accumulating in the lowermost corner of the fluid collecting container when it is in a tilted orientation is able to cause upward deployment of the float body and generation of a shut-off signal to stop fluid production in the system responsible for providing fluid to the container.

2. The clamping device of claim 1 wherein said clamping member further comprises a plurality of vertically-extending strengthening ribs associated with said slot.

3. The clamping device of claim 1 wherein said bridge has a tubular construction.

4. The clamping device of claim 1 wherein said clamping member has a greater width dimension than that of said bridge and said rail plates combined.

5. The clamping device of claim 1 wherein said clamping member has a lower end, and said rail plates each extend downwardly beyond said lower end of said clamping member.

6. The clamping device of claim 1 wherein said rail plates each have an upper end and said closed top end of said clamping member extends upwardly beyond said upper ends of said rail plates.

7. The clamping device of claim 6 wherein said bridge also comprises an upper end, and said closed top end of said clamping member extends upwardly beyond said upper end of said bridge.

8. The clamping device of claim 1 wherein each of said rail plates further comprises two ridged surfaces within said channel that are each positioned laterally and adjacent to said open-front configuration on a different one of its sides.

9. The clamping device of claim 1 wherein each of said at least two fasteners is a thumbscrew comprising an enlarged head configured for easy hand-manipulation.

10. The clamping device of claim 1 wherein said clamping member further comprises at least one air vent therethrough.

11. The clamping device of claim 1 wherein said clamping member has two of said threaded openings and further comprises a void area between said threaded openings.

12. The clamping device of claim 1 wherein each of said rail plates has a bottom end and further comprises a stop associated with said bottom end.

13. A clamping device for use in association with a fluid collecting container having a vertically-extending wall with a top edge, and for securely mounting a float switch housing and micro switch in a variety of fixed locations relative to the wall, so that when fluid accumulating in the container exceeds a predetermined depth considered safe, the deployable end of a float body pivotally secured within the housing will be raised a sufficient amount to activate the micro switch and cause it to send a shut-off signal that is then sent to the system providing fluid to the container to stop fluid production, said clamping device comprising:

unitary structure having a clamping member connected via a tubular bridge to two rail plates positioned in back-to-back orientation one to the other, said bridge having opposing ends and said clamping member depending from one of said opposing ends in perpendicular association with said bridge, said two rail plates depending from the other of said opposing ends of said bridge in a position where a portion of said bridge extends between said two rail plates, with said clamping member having a greater width dimension than that of said bridge and said two rail plates combined;

said clamping member having an inverted U-shaped configuration, an open-ended slot extending vertically through said inverted U-shaped configuration, and at least two threaded openings extending through the portion of said inverted U-shaped configuration remotely located from said bridge, said open-ended slot having a closed top end, and said threaded openings also being configured and positioned for communication with said slot;

each said rail plate having a vertically-extending channel with an open top end, said channel also having an open-front configuration facing away from the other one of said rail plates; and two thumbscrews each having threads configured for allowing secure engagement with a different one of said threaded openings associated with said clamping member, so that when said clamping member is positioned over the top edge of the vertically-extending wall of a fluid collecting container with said slot aligned with the top edge, and said bridge and said two rail plates are also placed in an orientation where they will be located within said fluid collecting container when said clamping member attains its desired position of use relative to the wall, and subsequently when said clamping member is lowered over the wall's top edge so that the top edge becomes inserted into said slot and lowering continues until the wall's top edge comes into contact with said closed top end of said slot and a portion of the wall below the top edge also becomes positioned in said slot, said thumbscrews can each be advanced through a different one of said threaded openings in said clamping member until contact is made with a portion of the wall within said slot, with said thumbscrews thereafter being tightened to fix said clamping member securely against the wall, and then if a float switch housing having a pivotally-deployable float body is placed in fixed association with said vertically-extending channel of one of said rail plates, the housing attains a parallel orientation to the wall that positions a lateral portion of the deployable end of the float body close to the wall, wherein even a small amount of fluid accumulating in the lowermost corner of the fluid collecting container when it is in a tilted orientation is able to cause upward deployment of the float body and generation of a shut-off signal to stop fluid production in the system responsible for providing fluid to the container.

14. The clamping device of claim 13 wherein said clamping member further comprises a plurality of vertically-extending strengthening ribs associated with said slot.

15. The clamping device of claim 13 wherein said clamping member has a lower end, and said rail plates each extend downwardly beyond said lower end of said clamping member.

16. The clamping device of claim 15 wherein said rail plates each have an upper end and said clamping member extends upwardly beyond said upper ends of said rail plates.

17. The clamping device of claim 16 wherein said bridge also comprises an upper end, and said closed top end of said clamping member extends upwardly beyond said upper end of said bridge.

18. The clamping device of claim 13 wherein each of said rail plates further comprises two ridged surfaces within said channel that are each positioned laterally and adjacent to said open-front configuration on a different one of its sides.

19. The clamping device of claim 13 wherein said clamping member further comprises a void area centrally between said two threaded openings.

20. A clamping device for use in association with a fluid collecting container having a vertically-extending wall with a top edge, and for securely mounting a float switch housing and micro switch in a variety of fixed locations relative to the wall, so that when fluid accumulating in the container exceeds a predetermined depth considered safe, the deployable end of a float body pivotally secured within the housing will be raised a sufficient amount to activate the micro switch and cause it to send a shut-off signal to the system providing fluid to the container, said clamping device comprising:

unitary structure having a clamping member connected via a tubular bridge to two rail plates positioned in back-to-back orientation one to the other, said bridge having opposing ends and said clamping member depending from one of said opposing ends in perpendicular association with said bridge, said two rail plates depending from the other of said opposing ends of said bridge in a position where a portion of said bridge extends between said two rail plates, with said clamping member having a greater width dimension than that of said bridge and said two rail plates combined;

said clamping member having an inverted U-shaped configuration, an open-ended slot extending vertically through the portion of said inverted U-shaped configuration remotely located from said bridge, said clamping member also having a plurality of vertically-extending strengthening ribs associated with said slot, with said slot having a closed top end, and further with said threaded openings being configured and positioned for communication with said slot;

each said rail plate having a vertically-extending channel with an open top end, said channel also having an open-front configuration facing away from the other one of said rail plates, with each said rail plate further comprising two ridged surfaces within said channel that are each positioned laterally to said open-front configuration on a different one of its sides; and two thumbscrews each having threads configured for allowing secure engagement with a different one of said threaded openings associated with said clamping member, so that when said clamping member is positioned over the top edge of the vertically-extending wall of a fluid collecting container with said slot aligned with the top edge, and said bridge and said two rail plates are also placed in an orientation where they will be located within said fluid collecting container when said clamping member attains its desired position of use relative to the wall, and subsequently when said clamping member is lowered over the wall's top edge so that the top edge becomes inserted into said slot and lowering continues until the wall's top edge comes into contact with said closed top end of said slot and a portion of the wall below the top edge is also positioned in said slot, said thumbscrews can each be advanced through a different one of said threaded openings in said clamping member until contact is made with a portion of the wall within said slot, with said thumbscrews thereafter being tightened to fix said clamping member securely against the wall, and then if a float switch housing having a pivotally-deployable float body is placed in fixed association with said vertically-extending channel of one of said rail plates, the housing attains a parallel orientation to the wall that positions a lateral portion of the deployable end of the float body close to the wall, wherein even a small amount of fluid accumulating in the lowermost corner of the fluid collecting container when it is in a tilted orientation is able to cause upward deployment of the float body and generation of a shut-off signal to stop fluid production in the system responsible for providing fluid to the container.

* * * * *